June 16, 1953  C. H. ARMSTRONG  2,642,254
VALVE

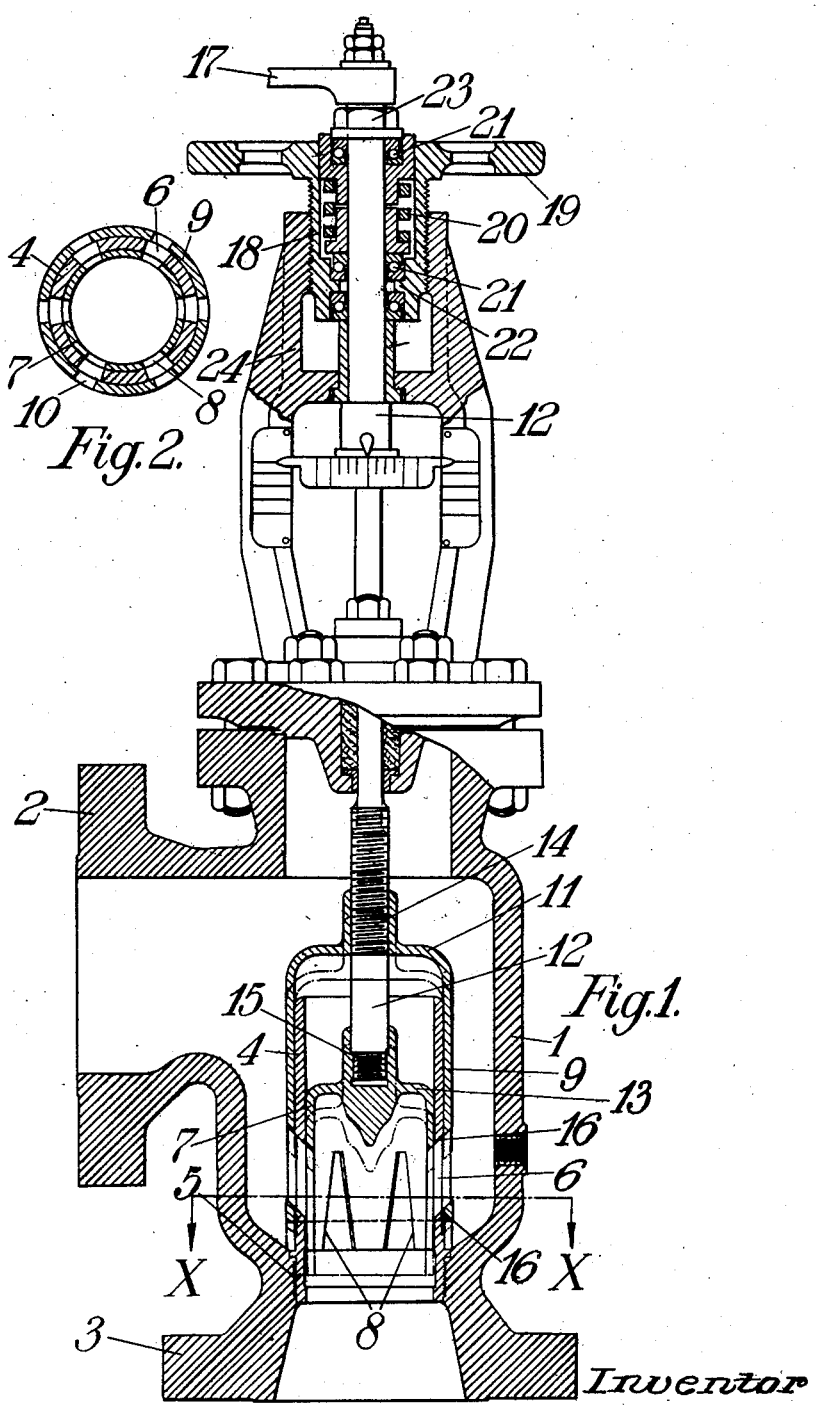

Filed May 22, 1950  2 Sheets-Sheet 2

Inventor
C. H. Armstrong
By Glenn K. Downing & Noble
Attys.

Patented June 16, 1953

2,642,254

UNITED STATES PATENT OFFICE 2,642,254

VALVE

Clifford Harry Armstrong, London, England, assignor to Copes-Regulators Limited, London, England Application May 22, 1950, Serial No. 163,373
In Great Britain June 10, 1949

6 Claims. (Cl. 251—4)

This invention relates to valves of the kind comprising hollow cylindrical ported members fitted concentrically one within the other and capable of being relatively rotated to vary the port opening, including valves in which such ported members can also be relatively displaced axially as shown for example in British patent specifications Nos. 303,238 and 458,378. The invention is intended more particularly for valves controlling the flow of fluid under relatively high pressure, for example as used in the supply of feed water to high pressure steam generators, although it may be applied to valves for other purposes.

Valves of the kind described controlling high pressure fluids, as for example boiler pressures of 900 lbs. per square inch and over, with a relatively large pressure drop across the valve, which may be 300 lbs. per square inch and over, are subject to considerable wear on account of the high velocity of fluid across the ports and this is liable to result in leakage. It is the object of this invention to provide an improved valve in which wear and consequent leakage are largely reduced. Another object is to provide a simple and convenient valve construction for the above purpose.

The invention consists in a valve of the kind described comprising associated inner and outer ported members and an intermediate ported member, having the port opening or openings of the inner or outer member, through which the fluid enters, formed to shroud or overlap the opening or openings of the intermediate member.

The invention also consists in a valve according to the preceding paragraph, in which the port or ports of the outer or inner member through which fluid enters the valve are of smaller circumferential extent than the corresponding port or ports of the intermediate member so that the coacting edge or face of the latter is shielded to some extent from the fluid flow.

Relative rotation between the inner and outer members and the intermediate member may be effected in any convenient manner, and according to a preferred arrangement the intermediate member is stationary and the inner and outer members are rotatable in unison with respect thereto.

The inner and outer members and the intermediate member may also be capable of relative axial displacement, which displacement may be effected either by hand, or automatically in accordance with a pressure differential. Both modes of adjustment may also be provided for if desired. In a preferred form of the invention, where relative axial displacement of the ported members is provided, the ports of the outer and inner members are of V or tapering shape, and the ports of the intermediate member are rectangular or have parallel sides.

The valve may be arranged so that the fluid enters either through the outer or through the inner ported member, the former being the preferred arrangement. Also it is preferred to form the port ends in the axial direction of the members at an inclination to their common axis to reduce resistance to the flow of fluid through the valve.

The ports are preferably of elongated shape disposed with their major axes parallel to the axis of rotation of the cylindrical valve members.

One mode of carrying the invention into effect will be described, by way of example, with reference to the accompanying drawing, in which Figure 1 is a sectional elevation, partly broken away, of a valve for controlling high pressure fluids, for example boiler feed water, constructed and arranged in accordance with the invention;

Figure 2 is a detail view showing the valve elements in cross section taken on the line X—X;

Figure 3:
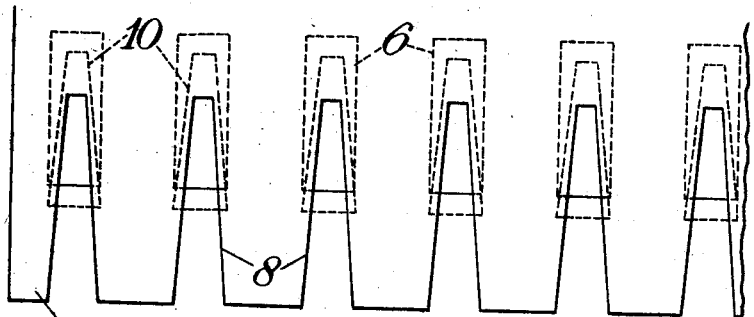
Figures 3, 4, 5 and 6 are developed views of portions of the valve elements showing the relative positions of the ports at various openings of the valve.

In carrying the invention into effect according to one convenient mode as applied by way of example to a valve for boiler feed control as illustrated in Figures 1 and 2, a valve casing 1 is provided having a flanged inlet pipe connection 2 and a similarly flanged outlet pipe connection 3 arranged at right angles to the connection 2. A fixed ported sleeve 4 is secured by a threaded connection 5 at its outer end in the casing 1 so that the sleeve is axially aligned with the outlet connection 3. This sleeve 4 constitutes the intermediate member of the valve and is formed with a number of uniformly spaced ports 6 which are of elongated rectangular shape and have their major axes parallel with the sleeve axis. Fitted to slide inside the sleeve and concentric therewith is an inner ported valve member 7 of hollow cylindrical form, closed at its upper end and open at its lower end which is adjacent the outer end of the sleeve 4. The inner valve member 7 is formed with longitudinally arranged ports 8 which correspond in position with the fixed sleeve ports 6 when the valve is in the fully open position, but are of V or tapered shape having their wider ends extending into the lower edge of the member. The V ports 8 are shaped so that their minimum width is less than the width of the fixed sleeve ports 6, and their maximum width may be equal to or greater than the above. Fitted to slide outside the fixed sleeve 4 and concentric therewith is an outer ported shroud member 9 of hollow cylindrical form, closed at its upper end and open at its lower end which extends over the rectangular sleeve ports 6. The outer shroud member 9 is formed with V-shaped or tapered ports 10 which are arranged and shaped similarly to the ports of the inner valve member 7. The closed end 11 of the shroud member 9 encloses the upper end of the ported sleeve 4 and a spindle 12 connects the member 9 with the closed end 13 of the inner valve member by means of threaded connections 14 and 15. The relative longitudinal position of the members 9 and 7 is such that on any given cross section, the width of the outer ports 10 is greater than the width of the inner ports 8. Also the edges at the end or ends of the various ports are inclined, as indicated at 16, with respect to the axis of the concentric valve members in order to facilitate the flow of fluid. The spindle 12 extends through a suitable stuffing box or seal in the valve casing and can be partially rotated by means of a lever 17 secured to the upper end thereof, whereby the ports of the inner and outer valve members uncover more or less of the sleeve ports or close the latter entirely according to the position of the lever.

Variation of the valve opening can also be effected by displacing the spindle 12 axially so as to bring more or less of the wider portion of the V or tapered ports into relation with the rectangular sleeve ports. For this purpose the upper end of the spindle is secured within a threaded housing 18 having a hand wheel 19 integral therewith. A spring 20 is held between a pair of thrust bearings 21 which bear respectively on a collar 22 on the housing and on a nut 23 on the spindle. The housing 18 is threaded into a mounting 24 secured to the valve casing, and by screwing the housing in and out the valve opening can be varied. Also the fluid pressure at the valve inlet acts on the upper end of the shroud member 9 and when this pressure exceeds a predetermined value the spindle will be moved inwardly against the spring 20 and the valve opening will be reduced. It will be understood that these arrangements for varying the axial position of the movable valve members may be omitted if desired or other arrangements having the same purpose may be employed.

Figure 4:
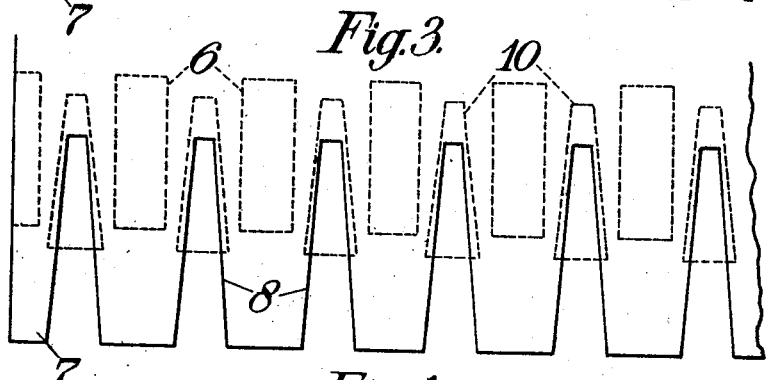
Figure 5:
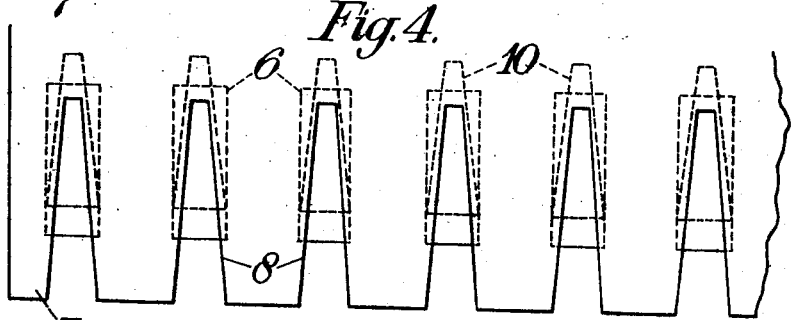
Figure 6:
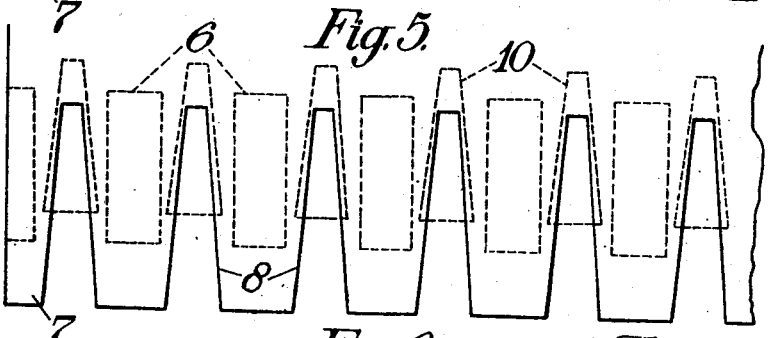

The arrangement is such that when the respective valve ports are in fully open position as shown for example in Figure 2, for any axial relation of the valve members, the edges of the ports of the outer or shroud member 9 overlap the fixed sleeve ports on both sides, owing to the lesser width of the former, and thereby the coacting edges of the ports in the sleeve 4 and in the inner valve member 7, and the fitted cylindrical surfaces adjacent such edges, are shielded to a greater or less extent from the flow of fluid passing through the valve. This shielding effect is a maximum when the ports are in fully open position as shown in Figure 2 and is reduced when the valve is rotated to a partially closed position. Since under the more usual operating conditions the valve will be either fully open or closed for the greater part of the total operating time, the shielding effect obtained is sufficient to reduce materially the tendency to wear and pitting of the coacting port edges and their adjacent fitted surfaces. In Figure 3 the relation of the various ports is shown when the angular position of the valve spindle is such as to give the largest possible opening and the hand wheel is screwed down to reduce the port area in the axial direction, this position of the valve members being indicated in broken lines in Figure 1. Figure 4 shows the relative positions with the valve closed. Figure 5 shows the relative positions for full opening with hand wheel screwed up. Figure 6 shows the fully closed position with the hand wheel screwed up.

In the example above described, the valve is arranged so that the fluid flows radially inwardly through the valve ports and leaves axially from the interior of the inner valve member. In an arrangement where the flow takes place in the opposite direction, the ports of the inner valve member would be of reduced width to afford the shielding effect, whereas the ports in the outer valve member would be of relatively greater width, corresponding to the width of the fixed sleeve ports. It will be understood that the shielding effect according to the invention may be obtained with ports of other shapes provided that the port edges of the member through which the fluid first flows are suitably related to the edges of the following ports.

It will be understood that the invention is not restricted to the example described, since details of construction may be varied to suit particular circumstances.

What is claimed is:

1. A valve of the kind described, comprising associated inner, outer and intermediate cylindrical ported members arranged to be relatively rotated to vary the valve opening, having the port opening of a member other than the intermediate member and through which the fluid enters formed to overlap the corresponding opening of the intermediate member when the port openings of the three members are aligned and the valve is in its fully open position so as to shield the intermediate port openings, some of the port openings being of tapering form in the direction of the common axis of the members and means being provided for effecting, in addition to the relative rotation, a relative axial displacement between the inner and outer members and the intermediate member to vary the valve opening.

2. A valve according to claim 1, in which the ports of the intermediate member have parallel sides and the ports of the outer member have tapering sides in the direction of the common axis of the members.

3. A valve according to claim 1, in which the ports of the intermediate member have parallel sides and the ports of the inner member have tapering sides in the direction of the common axis of the members.

4. A valve according to claim 1, in which the ports of the intermediate member have parallel sides and the ports of both the inner and outer members have tapering sides in the direction of the common axis of the members.

5. A valve of the kind described comprising a casing, a stationary open ended ported sleeve in the casing, inner and outer ported sleeves fitting over the intermediate sleeve and being each closed at one end, a spindle connecting the said inner and outer sleeves, and means for rotating the spindle to vary the valve opening, the port openings of a sleeve other than the intermediate sleeve being formed to overlap the corresponding openings of the intermediate sleeve when the port openings of the three sleeves are aligned and the valve is in its fully open position so as to shield the intermediate sleeve openings, in which the edges of the port openings are inclined to the common axis of the sleeves in such a manner as to reduce the resistance to fluid flow therethrough.

6. A valve of the kind described comprising a casing, a stationary open ended ported sleeve in the casing, inner and outer ported sleeves fitting over the intermediate sleeve and being each closed at one end, a spindle connecting the said inner and outer sleeves, means for rotating the spindle to vary the valve opening, the port openings of a sleeve other than the intermediate sleeve being formed to overlap the corresponding openings of the intermediate sleeve when the port openings of the three sleeves are aligned and the valve is in its fully open position so as to shield the intermediate sleeve openings, and means for effecting relative axial displacement between the inner and outer sleeves and the intermediate sleeve for additionally varying the port openings, the ports of the inner and outer sleeves being of tapering shape in the direction of the common axis of the members and the ports of the intermediate sleeve having parallel sides in the direction of the said common axis.

CLIFFORD HARRY ARMSTRONG.

References Cited in the file of this patent

UNITED STATES PATENTS

| Number | Name | Date |
|---|---|---|
| 1,151,751 | Barenz | Aug. 31, 1915 |
| 1,247,951 | Fuller | Nov. 27, 1917 |
| 1,274,426 | Lambert | Aug. 6, 1918 |
| 1,773,264 | Gilroy | Aug. 19, 1930 |
| 2,023,350 | Armstrong | Dec. 3, 1935 |
| 2,104,039 | Hunter | Jan. 4, 1938 |
| 2,105,681 | Armstrong | Jan. 18, 1938 |

FOREIGN PATENTS

| Number | Country | Date |
|---|---|---|
| 74,570 | Sweden | of 1932 |